US011570053B2

(12) United States Patent
Mandle et al.

(10) Patent No.: US 11,570,053 B2
(45) Date of Patent: Jan. 31, 2023

(54) SYSTEMS AND METHODS FOR ROUTING AND TOPOLOGY MANAGEMENT OF COMPUTER NETWORKS WITH STEERABLE BEAM ANTENNAS

(71) Applicant: Aalyria Technologies, Inc., Livermore, CA (US)

(72) Inventors: David Mandle, San Francisco, CA (US); Yaoyao Gu, Puyallup, WA (US); Brian Barritt, San Jose, CA (US); Tatiana Kichkaylo, Mountain View, CA (US)

(73) Assignee: Aalyria Technologies, Inc., Livermore, CA (US)

( * ) Notice: Subject to any disclaimer, the term of this patent is extended or adjusted under 35 U.S.C. 154(b) by 59 days.

(21) Appl. No.: 17/183,667

(22) Filed: Feb. 24, 2021

(65) Prior Publication Data

US 2021/0203560 A1 Jul. 1, 2021

Related U.S. Application Data

(63) Continuation of application No. 16/241,351, filed on Jan. 7, 2019, now Pat. No. 11,159,380, which is a
(Continued)

(51) Int. Cl.
*H04W 56/00* (2009.01)
*H04L 41/12* (2022.01)
(Continued)

(52) U.S. Cl.
CPC .............. *H04L 41/12* (2013.01); *H04L 41/22* (2013.01); *H04L 43/08* (2013.01); *H04L 45/02* (2013.01);
(Continued)

(58) Field of Classification Search
CPC ......... H04L 41/12; H04L 41/22; H04L 43/08; H04L 45/02; H04W 16/28; H04W 40/24
(Continued)

(56) References Cited

U.S. PATENT DOCUMENTS 5,430,729 A  7/1995 Rahnema
5,590,395 A  12/1996 Diekelman
(Continued)

FOREIGN PATENT DOCUMENTS

EP  2833298 A1  4/2015
EP  2985926 A1  2/2016
(Continued)

OTHER PUBLICATIONS

Australian Office Action for Application No. AU2018258169 dated Jun. 22, 2020.
(Continued)

*Primary Examiner* — Sai Ming Chan
(74) *Attorney, Agent, or Firm* — Platinum Intellectual Property LLP (57) ABSTRACT

This disclosure provides systems and methods for routing and topology management of computer networks with steerable beam antennas. A network controller can generate an input graph for a first time period. The input graph can have a plurality of vertices each representing a respective moving node and a plurality of edges each representing a possible link between a pair of moving nodes. The input graph also can include corresponding location information for each of the moving nodes during the first time period. A solver module can receive information corresponding to the input graph, a maximum degree for each vertex in the input graph, and a set of provisioned network flows. The solver module can determine a subgraph representing a network topology based on the input graph, the maximum degree for each
(Continued)

vertex in the input graph, and the set of provisioned network flows, such that a number of edges associated with each vertex in the subgraph does not exceed the maximum degree for each vertex.

20 Claims, 5 Drawing Sheets

Related U.S. Application Data continuation of application No. 15/137,747, filed on Apr. 25, 2016, now Pat. No. 10,177,985.

(51) Int. Cl.
| | |
|---|---|
| H04W 40/24 | (2009.01) |
| H04L 41/22 | (2022.01) |
| H04L 43/08 | (2022.01) |
| H04L 45/02 | (2022.01) |
| H04W 16/28 | (2009.01) |
| H04B 7/185 | (2006.01) |
| H04W 40/02 | (2009.01) |
| H04W 84/00 | (2009.01) |
| H04W 84/06 | (2009.01) |
| H04L 45/12 | (2022.01) |
| H04L 45/48 | (2022.01) |

(52) U.S. Cl.
CPC ........... *H04W 16/28* (2013.01); *H04W 40/24* (2013.01); *H04B 7/18504* (2013.01); *H04L 45/12* (2013.01); *H04L 45/48* (2013.01); *H04W 40/02* (2013.01); *H04W 84/005* (2013.01); *H04W 84/06* (2013.01)

(58) Field of Classification Search
USPC ........................................................ 370/254
See application file for complete search history.

(56) References Cited

U.S. PATENT DOCUMENTS

| | | | |
|---|---|---|---|
| 6,339,587 B1 | 1/2002 | Mishra | |
| 7,433,332 B2 | 10/2008 | Golden | |
| 7,502,382 B1 | 3/2009 | Liu | |
| 7,889,677 B1 | 2/2011 | Foldvik | |
| 8,116,632 B2 | 2/2012 | Miniscalco et al. | |
| 8,194,569 B2 | 6/2012 | Shorty et al. | |
| 8,543,944 B2 | 9/2013 | Dwyer | |
| 8,732,118 B1 | 5/2014 | Cole et al. | |
| 8,913,894 B2 | 12/2014 | Coleman et al. | |
| 8,989,586 B2 | 3/2015 | Arnold | |
| 9,042,734 B2 | 5/2015 | Makowski et al. | |
| 9,060,208 B2 | 6/2015 | Rieger et al. | |
| 9,083,425 B1 | 7/2015 | Frolov | |
| 9,258,765 B1 | 2/2016 | Dacosta | |
| 9,270,372 B2 | 2/2016 | Miniscalco | |
| 9,369,198 B2 | 6/2016 | Beals et al. | |
| 9,369,200 B1 | 6/2016 | Schmidtke et al. | |
| 9,438,341 B2 | 9/2016 | Brumley et al. | |
| 9,461,877 B1 | 10/2016 | Nadeau et al. | |
| 9,503,176 B2 | 11/2016 | Beals et al. | |
| 9,924,441 B1 | 3/2018 | Barritt | |
| 10,812,185 B2 | 10/2020 | Barritt | |
| 2004/0158663 A1* | 8/2004 | Peleg | ............... H04L 41/00 710/100 |
| 2008/0016213 A1 | 1/2008 | Akinaga et al. | |
| 2008/0162839 A1 | 7/2008 | Nakamichi et al. | |
| 2009/0154391 A1 | 6/2009 | Wittenschlaeger | |
| 2009/0279433 A1 | 11/2009 | Briscoe | |
| 2011/0126041 A1 | 5/2011 | Matsubara | |
| 2011/0243024 A1 | 10/2011 | Osterling et al. | |
| 2013/0177321 A1 | 7/2013 | Devaul et al. | |
| 2013/0238784 A1 | 9/2013 | Teller et al. | |
| 2013/0290520 A1 | 10/2013 | Noo et al. | |
| 2014/0207923 A1 | 7/2014 | Jokinen et al. | |
| 2014/0254592 A1 | 9/2014 | Olofsson et al. | |
| 2014/0293787 A1 | 10/2014 | Bourdelles | |
| 2016/0021597 A1 | 1/2016 | Hart | |
| 2016/0037434 A1* | 2/2016 | Gopal | .................. H04B 7/1851 370/316 |
| 2016/0050013 A1 | 2/2016 | Brownjohn | |
| 2016/0197668 A1 | 7/2016 | Alcorn | |
| 2016/0205560 A1 | 7/2016 | Hyslop | |
| 2018/0041400 A1 | 2/2018 | Ngoo et al. | |

FOREIGN PATENT DOCUMENTS

| | | |
|---|---|---|
| JP | H07193868 A | 7/1995 |
| JP | H10341196 A | 12/1998 |
| WO | 2012114296 A1 | 8/2012 |

OTHER PUBLICATIONS

Brian J. Barritt and Wesley M. Eddy, Temporospatial SDN for Aerospace Communicatons, AIAA Space 2015 Conference and Exposition, AIAA Space Forum, 5 pages.
International Search Report and Written Opinion for Application No. PCT/US2018/029385, dated Aug. 13, 2018.
Japanese Office Action for Application No. JP2019-556223 dated Oct. 26, 2020.
Singapore Search Report and Written Opinion for Application No. SG11201909354X dated Jun. 6, 2020.
Supplementary European Search Report for European Application No. 18790338 dated Dec. 23, 2020.
Wiikipedia, "Forwarding information base (FIB)" [online], [Retrieved May 24, 2017], Retrieved from the internet: https://en.Wikipedia.org/wiki/F orwarding_information _base. 4 pages.
Barritt , et al., "Operating a UAV Mesh & Internet Backhaul Network using Temporospatial SDN", IEEE Aerospace Conference, 2017, 7 pages.
Barritt , et al., "SDN Enhancements for LEO Satellite Nelworks", 34th AIAA International Communications Satellite Systems Conference, International Communications Satellite Systems Conferences ICSSC), Oct. 2016, 10 pages.

* cited by examiner

SYSTEMS AND METHODS FOR ROUTING AND TOPOLOGY MANAGEMENT OF COMPUTER NETWORKS WITH STEERABLE BEAM ANTENNAS

RELATED APPLICATIONS

The present application is a continuation of, and claims the benefit of and priority to, U.S. patent application Ser. No. 16/241,351, filed on Jan. 7, 2019, which is a continuation of, and claims the benefit of and priority to, U.S. patent application Ser. No. 15/137,747, filed on Apr. 25, 2016 and issued as U.S. Pat. No. 10,177,985 on Jan. 8, 2019, the entire contents of which are hereby incorporated by reference for all purposes.

BACKGROUND

Information can be transmitted over computer networks, such as aerospace and other mobile networks. In such networks, one or more of the network nodes may move over time, such that a pair of network nodes that were previously linked can no longer form a link. As a result, it can be difficult to maintain connectivity of network nodes to satisfy provisioned network flows.

SUMMARY

In some aspects, the disclosure relates to a method for configuring a network having a plurality of nodes including at least one moving node. The method can include generating, by a network controller, an input graph for a first future time period. The input graph can have a plurality of vertices each representing a respective one of the plurality of nodes and a plurality of edges each representing a possible link between two of the plurality of nodes. The input graph can include corresponding location information for each of the nodes during the first time period and an edge for every possible link that could be formed for the first time period between the nodes based on their corresponding location information. Each edge can be associated with at least one network performance metric. The method can include receiving, by a solver module, information corresponding to the input graph, a maximum degree for each vertex in the input graph, and a set of provisioned network flows. The method can include determining, by the solver module, a subgraph representing a network topology based on the input graph, the maximum degree for each vertex in the input graph, and the set of provisioned network flows. A number of edges associated with each vertex in the subgraph may not exceed the maximum degree for each vertex. The method can include assigning, by the network controller, links between the plurality of nodes based on the subgraph. The method can include determining, by the network controller, link establishment instructions for the plurality of nodes. The method can include to causing, by the network controller, the plurality of nodes to establish the assigned links.

Another innovative aspect of the subject matter described in this disclosure can be implemented in a system for configuring a network having a plurality of nodes including at least one moving node. The system can include the plurality of nodes, a network controller communicatively coupled to the plurality of nodes, and a solver module. The system can be configured to generate an input graph for a first future time period. The input graph can have a plurality of vertices each representing a respective one of the plurality of nodes and a plurality of edges each representing a possible link between two of the plurality of nodes. The input graph can include corresponding location information for each of the nodes during the first time period and an edge for every possible link that could be formed for the first time period between the nodes based on their corresponding location information. Each edge is associated with at least one network performance metric. The system can be configured to receive information corresponding to the input graph, a maximum degree for each vertex in the input graph, and a set of provisioned network flows. The system can be configured to determine a subgraph representing a network topology based on the input graph, the maximum degree for each vertex in the input graph, and the set of provisioned network flows. A number of edges associated with each vertex in the subgraph may not exceed the maximum degree for each vertex. The system can be configured to assign links between the plurality of nodes based on the subgraph. The system can be configured to determine link establishment instructions for the plurality of nodes. The system can be configured to cause the plurality of nodes to establish the assigned links.

Another innovative aspect of the subject matter described in this disclosure can be implemented in a non-transitory computer-readable medium having instructions encoded thereon which, when executed by one or more processors, cause the one or more processors to perform a method for configuring a directional point-to-point network having a plurality of nodes including at least one moving node. The method can include generating, by a network controller, an input graph for a first future time period. The input graph can have a plurality of vertices each representing a respective one of the plurality of nodes and a plurality of edges each representing a possible link between two of the plurality of nodes. The input graph can include corresponding location information for each of the nodes during the first time period and an edge for every possible link that could be formed for the first time period between the nodes based on their corresponding location information. Each edge can be associated with at least one network performance metric. The method can include receiving, by a solver module, information corresponding to the input graph, a maximum degree for each vertex in the input graph, and a set of provisioned network flows. The method can include determining, by the solver module, a subgraph representing a network topology based on the input graph, the maximum degree for each vertex in the input graph, and the set of provisioned network flows. A number of edges associated with each vertex in the subgraph may not exceed the maximum degree for each vertex. The method can include assigning, by the network controller, links between the plurality of nodes based on the subgraph. The method can include determining, by the network controller, link establishment instructions for the plurality of nodes. The method can include to causing, by the network controller, the plurality of nodes to establish the assigned links.

BRIEF DESCRIPTION OF THE DRAWINGS

The above and related objects, features, and advantages of the present disclosure will be more fully understood by reference to the following detailed description, when taken in conjunction with the accompanying figures, wherein.

For purposes of clarity, not every component may be labeled in every figure. The drawings are not intended to be drawn to scale. Like reference numbers and designations in the various figures indicate like elements.

DETAILED DESCRIPTION

The systems and methods of the disclosure relate to managing topology and routing in a directional point-to-point computer network. Particularly, the disclosure describes techniques for determining a current topology of a computer network, including the current geographical position of network nodes, some of which may move over time. An input graph can be constructed to represent the current state of the network and all of the possible links that could be formed between network nodes given the current state of the network. Based on the input graph and the network flows that have already been provisioned, a subgraph can be generated representing a network topology which can be implemented based on the location of the network nodes and which can satisfy the provisioned network flows.

Figure 1:
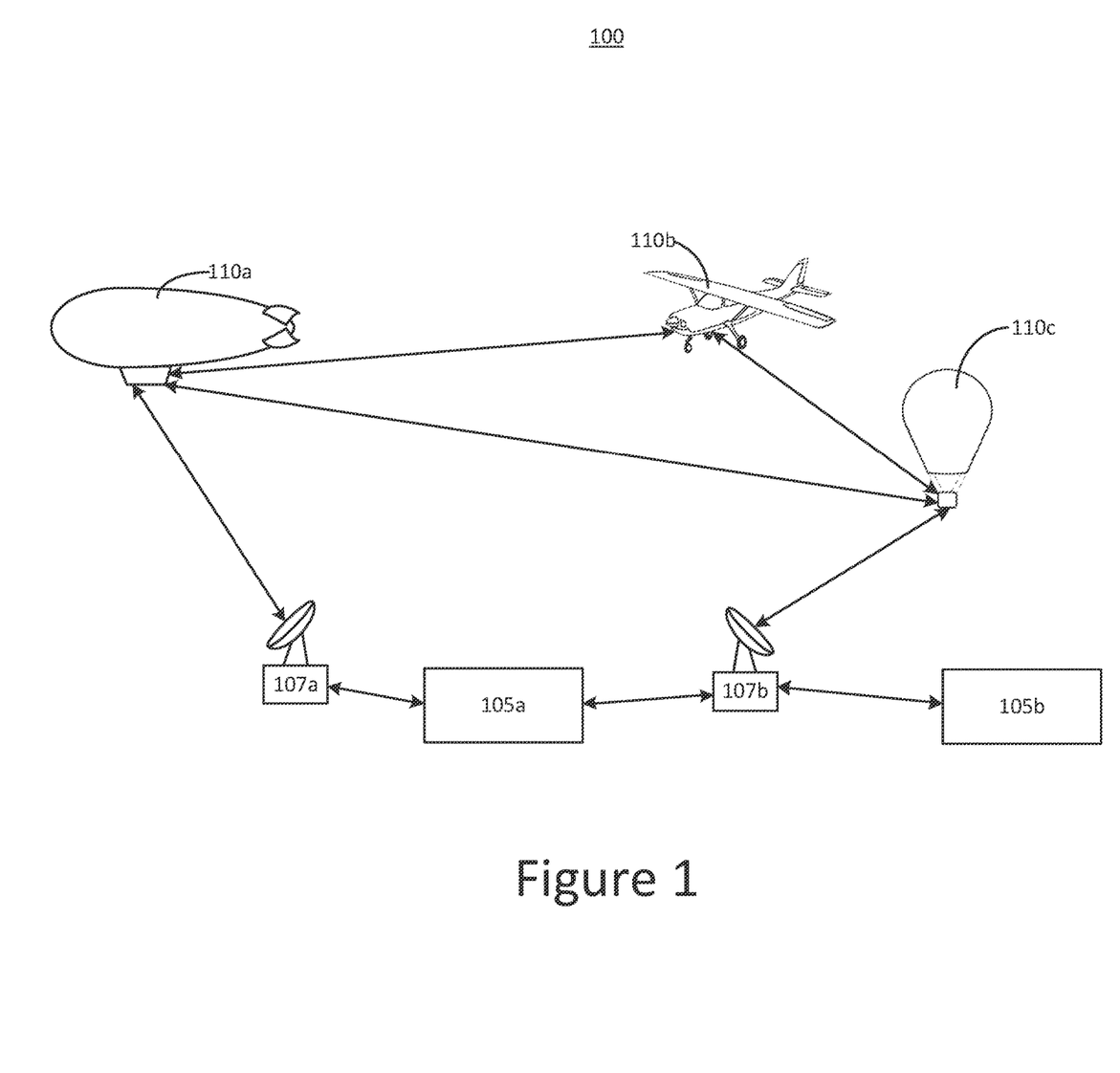
FIG. 1 is a block diagram of an example directional point-to-point computer network.

FIG. 1 is a block diagram of an example directional point-to-point computer network 100. The computer network 100 is a directional point-to-point computer network consisting of nodes mounted on various land- and air-based devices, some of which may change position with respect to other nodes in the network 100 over time. For example, the network 100 includes nodes associated with each of two land-based datacenters 105a and 105b (generally referred to as datacenters 105), nodes associated with each of two ground stations 107a and 107b (generally referred to as ground stations 107), and nodes associated with each of three airborne high altitude platforms (HAPs) 110a-110c (generally referred to as HAPs 110). As shown, the HAP 110a is a blimp, the HAP 110b is an airplane, and the HAP 110c is a balloon. Arrows shown between a pair of nodes represent active communication links between the nodes. It should be understood that the network 100 as shown in FIG. 1 is illustrative only, and in some implementations the network 100 may include additional or different nodes. For example, in some implementations, the network 100 may include additional HAPS, which may be blimps, airplanes, unmanned aerial vehicles (UAVs), or any other form of high altitude platform. In some implementations, additional network nodes also may be mounted on sea-based platforms or on space-based platforms, such as satellites. In some implementations, the network 100 may serve as an access network for client devices such as cellular phones, laptop computers, desktop computers, wearable devices, or tablet computers. The network 100 also may be connected to a larger network, such as the Internet, and may be configured to provide a client device with access to resources stored on or provided through the larger computer network. In some implementations, the HAPs 110 can include wireless transceivers associated with a cellular or other mobile network, such as eNodeB base stations or other wireless access points, such as WiMAX or UMTS access points. Together, the HAPs 110 can form a wireless access network. The HAPs 110 can connect to the datacenters 105, for example, via backbone network links or transit networks operated by third parties. The datacenters 105 may include servers hosting applications that are accessed by remote users as well as systems that monitor and control the components of the network 100. The HAPs 110 can provide wireless access for the users, and can route user requests to the datacenters 105 and return responses to the users via the backbone network links.

Some of the nodes of the network 100 can be configured to communicate with one another using steerable wireless transceivers. Such transceivers may be mounted to actuators that can be controlled to point in a desired direction. To form a link between two directional nodes, such as the node associated with the HAP 110a and the node associated with the HAP 110b, the transceivers of the respective nodes can be controlled to point in the direction of one another so that data can be sent and received between the nodes. In some implementations, some of the nodes may include transceivers with omnidirectional antennas and therefore are not required to be steered towards other nodes to form communication links. Similarly, some of the nodes may include directional transceivers whose positions are fixed and cannot be adjusted. In some implementations, parameters associated with each transceiver can be controlled to facilitate formation of the links in the network 100. For example, nodes having steerable directional antennas can be controlled to point in the direction of nodes with which they are to establish links. In addition, the power of the signals transmitted by each transceiver can also be controlled to facilitate formation of the links in the network 100. For example, transceivers of nodes that are separated by a relatively large distance can be configured to operate at a higher power to compensate for the loss of signal-to-noise ratio that occurs over the distance separating the two nodes. Transceivers of odes that are spaced nearer to one another may be controlled to operate at a relatively lower power so as to save power. The communication channels and protocols for pairs of nodes that are to establish links can also be controlled to facilitate the formation of the links in the network 100.

In general, each directional transceiver can be aimed at only one other transceiver at a given time, and each transceiver must be able to operate at a sufficient power in order to form a link with a transceiver of another node. Furthermore, omnidirectional nodes may only be capable of forming a limited number of simultaneous communication links. As a result, the feasible topologies for the network 100 at a given time are constrained. For example, each network node will have a fixed number of transceivers, and thus the number of links coupling a first node to other nodes (sometimes referred to as the degree of the first node) must be no greater than the number of transceivers associated with the first node. Furthermore, the maximum range for each transceiver is limited by the maximum power output for the transceiver, and therefore a link cannot be established between a pair of nodes that are separated by a distance that exceeds the maximum range for either of their transceivers. In some implementations, the maximum power output for a transceiver can be constrained based on a variety of factors, including a battery level, weather conditions that may impact solar power generation rates, and remaining flight time for a HAP 110.

Further constraining the feasible topologies of the network 100 is the requirement that the path between a pair of nodes should be clear of obstructions in order for the nodes to form a link. In some implementations, the relative motion of the nodes in the network 100 may prevent the formation of links at some points in time. For example, while the network 100 shows a link between the HAP 110c and the ground station 107b, the link joining these two nodes may become unreliable at times during which clouds are positioned between the HAP 110c and the ground station 107b. Similarly, the link between the HAP 110b and the balloon 110a may not be feasible when the path of the HAP 110b brings the HAP 110b into a position in which the earth, e.g., a mountain, is positioned between it and the HAP 110a. Thus, movement of the HAPs 110, as well as external events such weather or failure of one or more transceivers, can limit the subset of nodes that are reachable from a given node at a given time in the network 100. As result, links and routing information must be continuously updated based on the respective locations of the network nodes and other properties of the network nodes to maintain connectivity across the network 100 over time. To achieve this, in some implementations an input graph representing all of the possible links that can be formed in the network at a given time can be generated and processed to generate a subgraph that conforms to the constraints discussed above while satisfying any provisioned network flows.

Figure 2A:
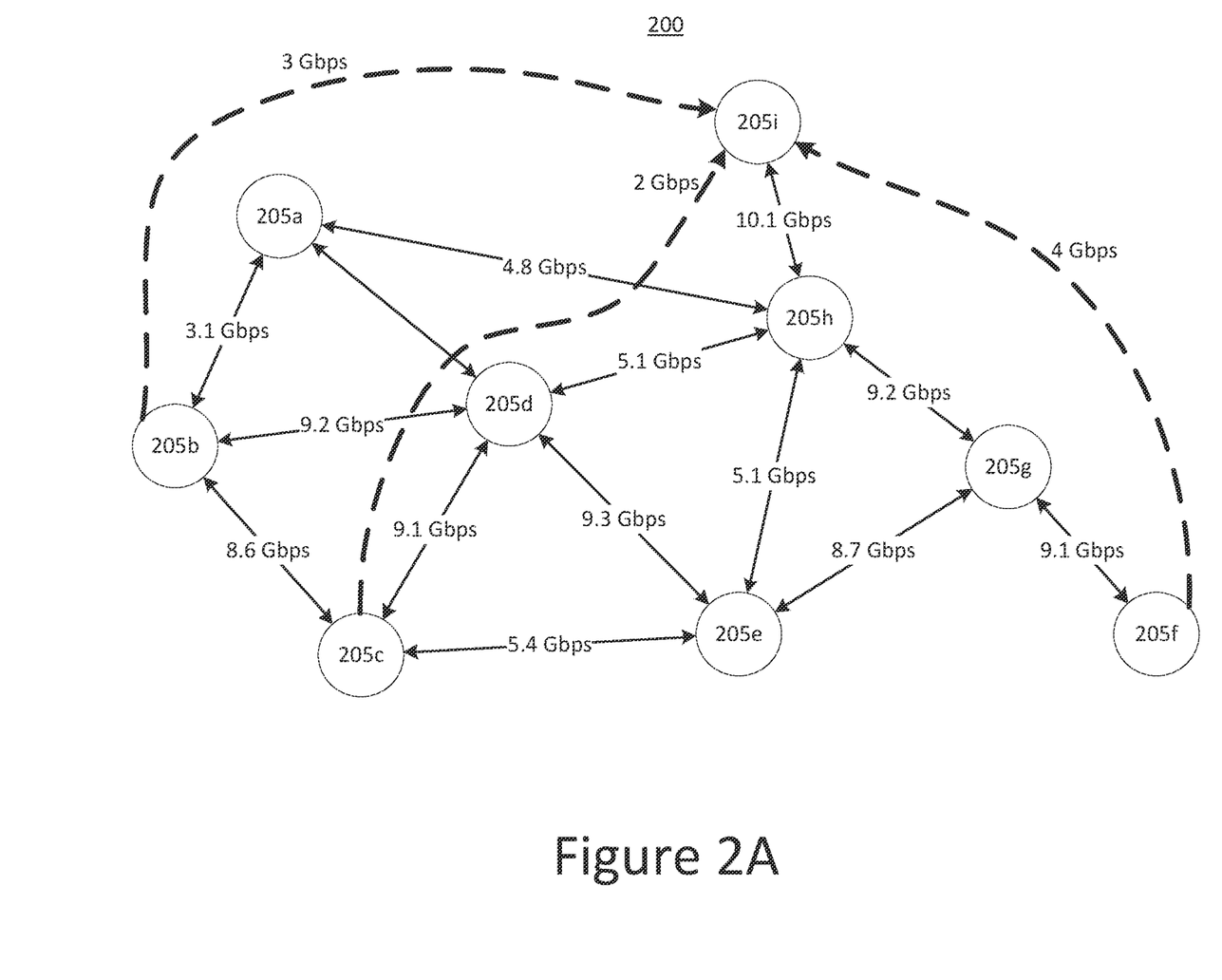
FIG. 2A is a schematic diagram of an input graph for an example computer network.

FIG. 2A is a schematic diagram of an input graph 200 for an example computer network. The input graph 200 includes a plurality of vertices 205a-205i (generally referred to as nodes 200) joined by edges represented by solid arrows. Each vertex 205 can represent a network node, and each edge can represent a link joining a pair of network nodes. Each edge in the input graph 200 includes an associated bandwidth expressed in gigabits per second (Gbps). Also shown in FIG. 2A are a series of broken lines representing provisioned network flows and their respective bandwidths. For example, a first flow requiring 3 Gbps of bandwidth is provisioned between the network node represented by the vertex 205b and the network node represented by the vertex 205i, a second flow requiring 2 Gbps of bandwidth is provisioned between the network node represented by the vertex 205c and the network node represented by the vertex 205i, and a third flow requiring 4 Gbps of bandwidth is provisioned between the network node represented by the vertex 205f and the network node represented by the vertex 205i. It should be understood that the provisioned flows shown in broken lines are not themselves part of the input graph 200, but are shown overlaid onto the input graph 200 for illustrative purposes.

The input graph 200 can be a graph representing all of the possible options for links at a given time, based on the geographical locations of the nodes at that time. In some implementations, the input graph 200 can be an unbounded, maximum spanning graph. In some implementations, the input graph may represent all of the possible options for links during a given window of time. For example, the duration of such a time window can be selected to be equal to or longer than the period for which a network topology is desired to remain valid. In implementations in which the network is reconfigured at a specified frequency, the time window can be equal to the reciprocal of the reconfiguration frequency (i.e., equal to the reconfiguration period). To ensure that the network is actually capable of forming the links represented by the edges in the input graph 200, the input graph 200 may include an edge 200 only if the edge 200 represents a link that could be present in the network during the entire duration, or substantially the entire duration, of the selected time window. The input graph 200 can include edges representing both active and potential links, and no constraints are placed on the number of edges between the vertices 205 in the input graph 200. For example, while the node represented by the vertex 205a may include only a single transceiver (i.e., it may have a degree of one), there is no limit on the number of edges that may connect to the vertex 205a in the input graph 200. An edge can be present in the input graph 200 so long as the vertices 205 joined by the edge represent nodes that are accessible (i.e., could be established) at the given time based on the locations and physical communication channel capabilities of the respective nodes. For example, an edge can be present in the input graph 200 if the vertices 205 joined by the edge represent nodes that are within range of one another, have transceivers that are compatible with one another, and are each able to use their transceivers to communicate with one another without obstruction. In some implementations, the input graph 200, and other information such as information regarding the provisioned flows, can be used to determine a subgraph representing a feasible network topology that is able to satisfy the provisioned network flows. An example of such a subgraph is described further below in connection with FIG. 2B.

Figure 2B:
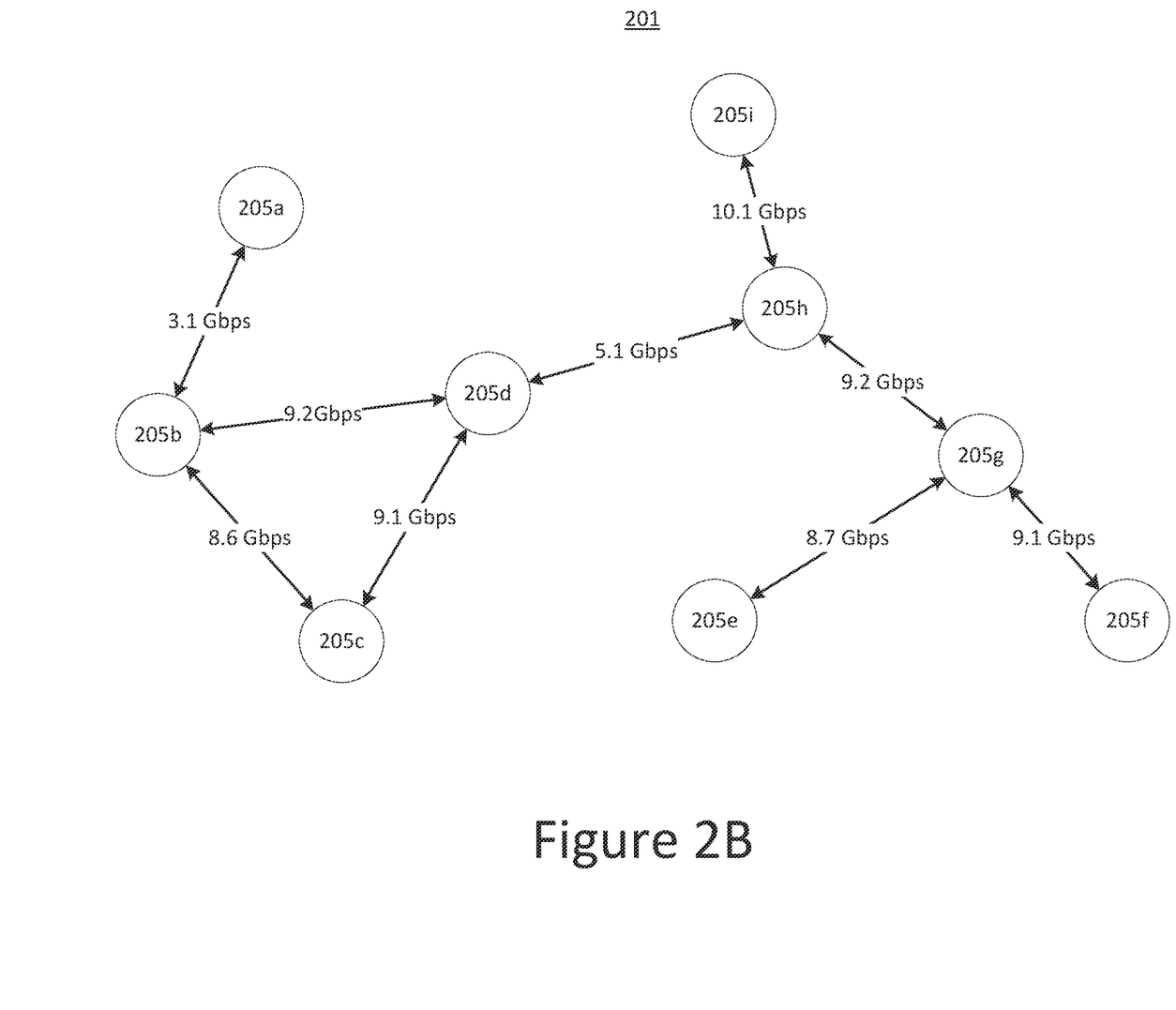
FIG. 2B is a schematic diagram of a subgraph based on the input graph shown in FIG. 2A.

FIG. 2B is a schematic diagram of a subgraph 201 based on the input graph 200 shown in FIG. 2A. The subgraph 201 is bounded in ways that match the constraints of the network that it represents. For example, in the subgraph 201, the degree of each vertex 205 is constrained such that the number of edges connecting to each vertex 205 does not exceed the maximum number of links supported by the nodes represented by each vertex 205. The subgraph 201 also is selected such that the links represented by the edges in the subgraph 201 are capable of satisfying the provisioned network flows as shown in FIG. 2A. For example, the 3 Gbps flow from the vertex 205a to the vertex 205i can be carried along a path from the vertex 205a through the vertices 205b, 205d, and 205h. The 2 Gbps flow from the vertex 205c to the vertex 205i can be carried along a path from the vertex 205c through the vertices 205d and 205h. The 4 Gbps flow from the vertex 205f to the vertex 205i can be carried along a path from the vertex 205f through the vertices 205g and 205h. In some implementations, the input graph 200 can be processed along with other information, such as the provisioned network flows and network performance metrics such as latency, bandwidth, link lifetime, or topology lifetime, to generate the subgraph 201. After the subgraph 201 has been generated, the nodes of the network can be controlled to form the links represented by edges in the subgraph 201 and update their routing tables to implement the topology represented by the subgraph 201. Additional details regarding various techniques for generating the subgraph 201 based on the input graph 200 are described further below.

Figure 3:
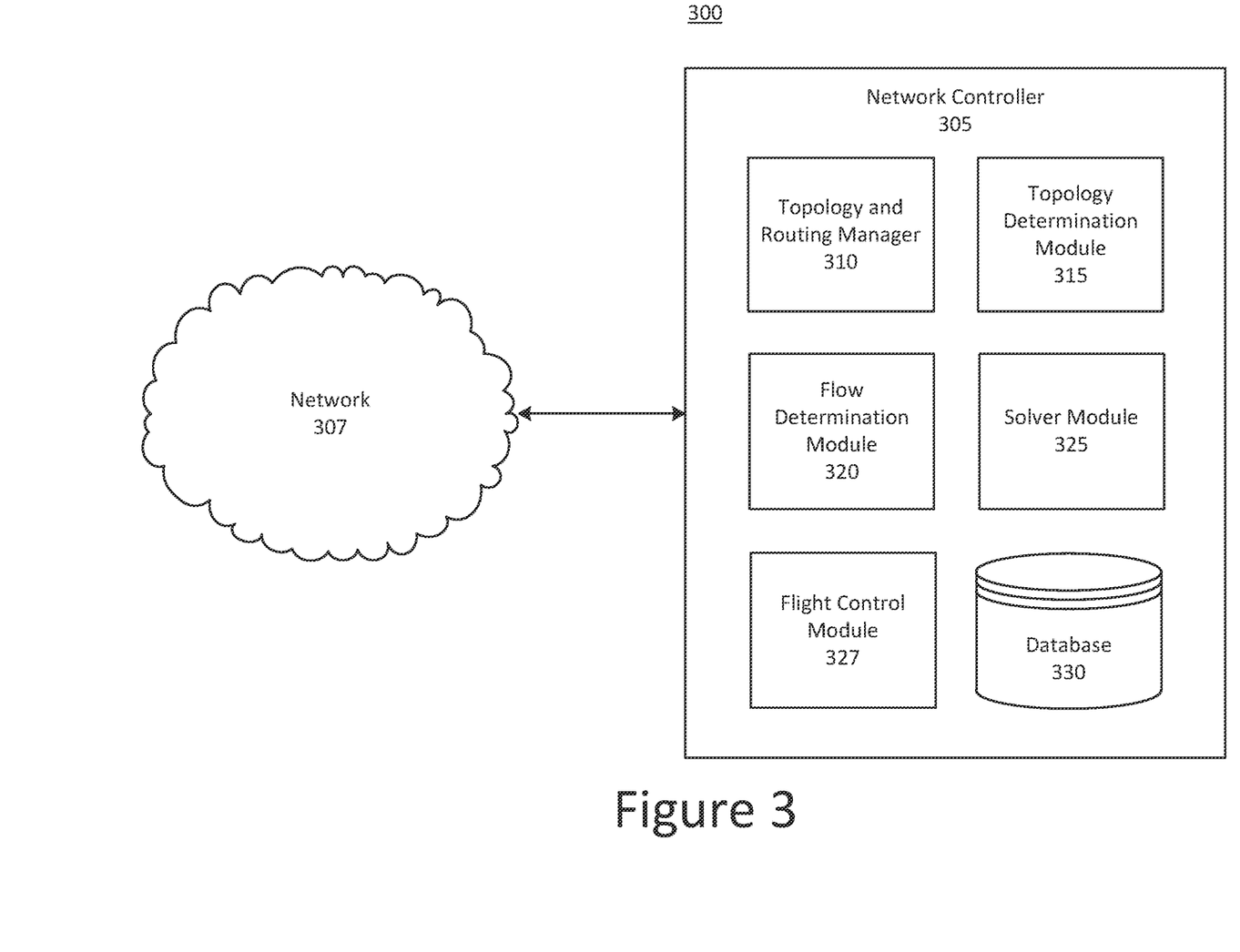
FIG. 3 is a block diagram of an example system for configuring a computer network.

FIG. 3 is a block diagram of an example system 300 for configuring a computer network. The system 300 includes a network controller 305 in communication with a network 307. In some implementations, the network 307 may be a point-to-point network having one or more nodes that move relative to other nodes over time, similar to the network 100 shown in FIG. 1. The network controller may be any type of computing device capable of configuring the topology of the network 307 and passing routing information to the nodes of the network 307. In some implementations, the network 307 can be a software-defined network (SDN), and the network controller 305 can be an SDN controller. Although the network controller 305 is shown as a component separate from the network 307, it should be understood that in some implementations, the network controller 305 may be part of the network 307. The network controller 305 includes a topology and routing manager 310, a topology determination module 315, a flow determination module 320, a solver module 325, a flight control module 312, and a database 330.

In some implementations, the topology and routing manager 310 can serve as the interface between the network controller 305 and the network 307. The topology and routing manager 310 can receive information from each of the nodes within the network 307. For example, in some implementations, the topology and routing manager 310 may receive information from each node in the network 307 corresponding to the current location of each node, the predicted path of each node, the current links associated with each node, and the routing information stored by each node. Each node also may send to the topology and routing manager 310 information corresponding to any failed links, which may occur due to unforeseen obstructions between nodes or due to failure of one or more transceivers. In some implementations, the topology and routing manager 310 can receive predicted link metrics from each node. For example, a predicted link metric may include a predicted value of a network performance metric for a hypothetical link that may be formed in the future. Network performance metrics can include bandwidth capacity, latency, or link lifetime duration, and can be based on the predicted relative motion of the nodes in the network 307. Link lifetime duration can represent the period of time during which a link is feasible in the network 307. In some implementations, the topology and routing manager 310 also can receive information relating to the applications whose data is being transmitted through the network 307, such as the sources and destinations for application data. The topology and routing manager 310 can store the information it receives from the network in the database 330.

The topology determination module 315 can be configured to determine the current topology of the network 315. In some implementations, the determination can be made based on the information received by the topology and routing manager 310. For example, the topology determination module 315 can be configured to aggregate the information relating to the current location of each node, the links formed between each pair of nodes, and any failed links that may exist within the network 307. The topology determination module 315 can receive this information from the topology and routing manager 310, or may retrieve this information from the database 330. In some implementations, the topology determination module 315 can receive information from the flight control module 327 corresponding to the flight paths of the airborne network nodes over the time window associated with the input graph. The topology determination module can aggregate this information to determine the topology of the network 307 over the time window associated with the input graph. In some implementations, the topology determination module 315 can be configured to generate an input graph similar to the input graph 200 shown in FIG. 2A, based on the topology of the network 307. In some other implementations, the topology determination module can provide the topology information to the topology and routing manager 310, which can construct the input graph based on the topology information.

The flow determination module 320 can be configured to determine all of the flows that are currently provisioned in the network 307. In some implementations, the flow determination module 320 can determine the provisioned flows based on the application data that is received by the topology and routing manager 310. In some implementations, the flow determination module 320 also can determine other information related to provisioned flows, such as the class of service or quality of service for each provisioned flow. In some implementations, the flow determination module 320 can aggregate the application data to determine the total amount of bandwidth required between each node pair in the network 307. In some implementations, the flow determination module 320 can aggregate the application data at a more granular level. For example, in some implementations, the network data for each pair of nodes can be aggregated by class of service, quality of service, or any other relevant network traffic discriminator. This information can be stored, for example, in the database 330.

The solver module 325 can be configured to generate a subgraph based on the input graph constructed by the topology and routing manager 310 or by the topology determination module 315. As discussed above, the subgraph can represent a feasible network topology that is capable of satisfying all provisioned network flows. In some implementations, the solver also may compute routing paths for the provisioned flows over the topology represented by the subgraph. In some implementations, the solver module 325 can be configured to generate the subgraph based in part on additional information that may not be included in the input graph. For example, the solver module 325 may generate a subgraph that takes into account various network performance metrics such as link bandwidth, link latency, flow bandwidth, flow priority, link switching time (i.e., the time required to implement a new topology in the network 307), link duration, and topology duration. Each of these metrics may be modeled as a constraint that is weighted when generating the subgraph. In some implementations, the solver module also may receive information corresponding to the current state of the network, and may attempt to generate a subgraph that minimizes of reduces the topological changes that must be made to the current network topology. After the solver module 325 has generated a subgraph and routing information, the topology and routing manager 310 can be configured to control the nodes of the network 307 to implement the topology represented by the subgraph by sending instructions to the nodes to cause the nodes to form the links represented by edges in the subgraph (e.g., by steering their respective transceivers, adjusting their respective transmission power levels, setting their transmission and reception frequency bands, etc.) and update their routing tables accordingly.

In some implementations, the solver module 325 may be unable to determine a subgraph representing a network that is capable of satisfying all of the provisioned network flows. For example, one or more of the airborne network nodes in the network 307 may drift too far from the other network nodes to be able to form a link. To address this, the flight control module 327 can generate instructions for the airborne nodes of the network 307 that cause the airborne nodes to alter their flight paths such that additional links may be formed, for example by causing the airborne nodes to move closer to one another or to avoid obstructions. After the nodes have been repositioned according to the instructions generated by the flight control module 327, an updated input graph can be created based on the new locations of the network nodes, and the updated input graph can be processed by the solver module 325 to attempt to determine a suitable subgraph.

Figure 4:
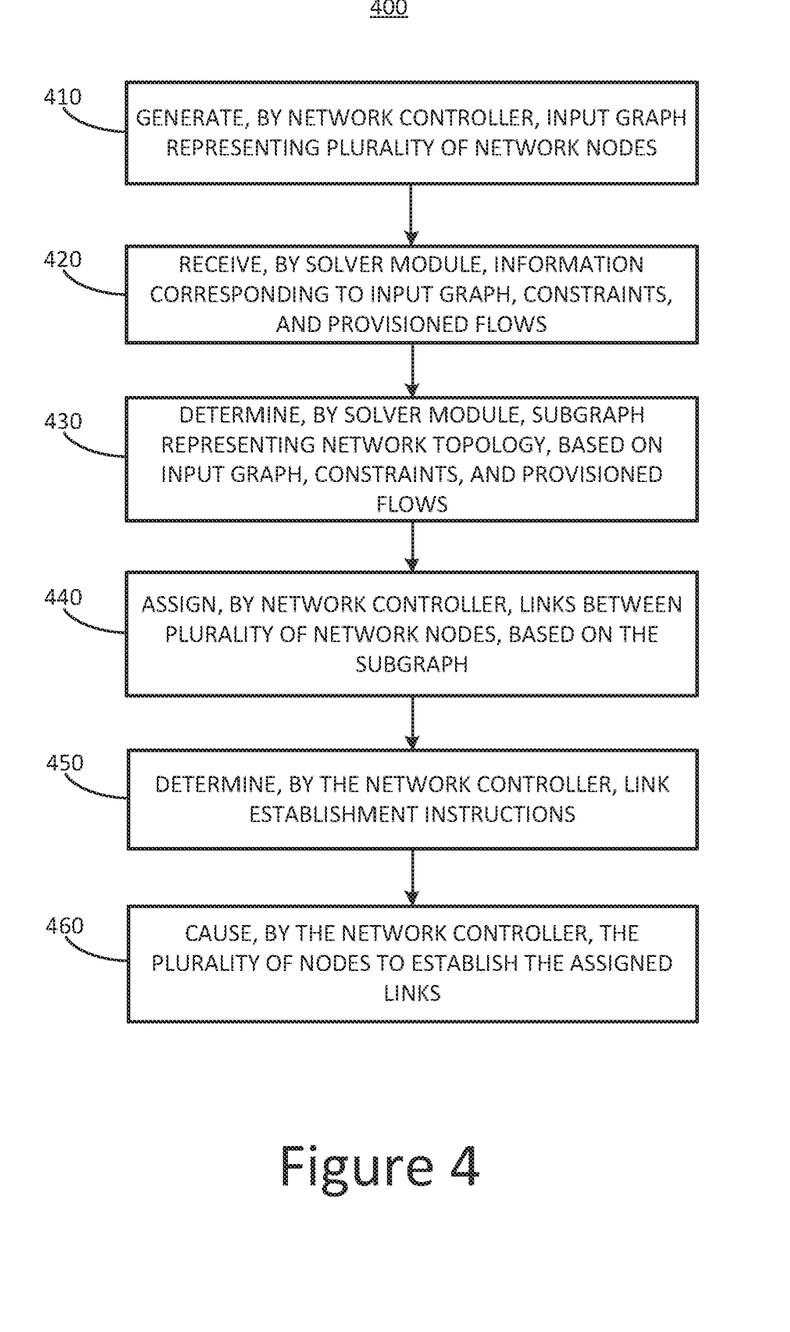
FIG. 4 is a flowchart of an example method for configuring a computer network.

FIG. 4 is a flowchart of an example method 400 for configuring a computer network. In brief overview, the method 400 includes generating, by a network controller, an input graph representing a plurality of network nodes (stage 410), receiving, by a solver module, information corresponding to the input graph, other constraints, and provisioned network flows (stage 420), determining, by the solver module, a subgraph representing a network topology based on the input graph, the other constraints, and the provisioned network flows (stage 430), assigning, by the network controller, links between the plurality of network nodes, based on the subgraph (stage 440), determining, by the network controller, link establishment instructions for the plurality of nodes (stage 450), and causing, by the network controller, the plurality of nodes to establish the assigned links (stage 460).

Referring again to FIG. 4, the method 400 includes generating, by a network controller, an input graph representing a plurality of network nodes (stage 410). In some implementations, the topology and routing manager 310 shown in FIG. 3 can construct the input graph. The input graph can represent all of the existing and possible links that could be formed in the network at a given time, similar to the input graph 200 shown in FIG. 2A. For example, the topology and routing manager 310 can retrieve the topology information generated by the topology determination module 315. From the topology information, the topology and routing manager 310 can construct an input graph having a vertex for each node in the network, and an edge representing each link that could exist during a given time window based on the geographic locations of the nodes and the physical capabilities of the transceivers associated with the nodes. In some implementations, there is no limitation on the number of edges that can be included between vertices in the input graph. Instead, an edge will exist in the input graph so long as the nodes represented by the vertices connected by the edge could form a link based on their predicted geographic locations during the time window associated with the input graph and compatibility of their respective transceivers. In some implementations, the input graph also can include additional information, such as information relating to a performance metric (e.g., maximum available bandwidth) associated with each edge.

The method 400 includes receiving, by a solver module, information corresponding to the input graph, other constraints, and provisioned network flows (stage 420). In some implementations, the solver module may receive other constraints such as link bandwidth, link latency, flow bandwidth, flow priority, and link switching time. In some implementations, some such constraints may be associated with a minimum value, a maximum value, or a required value. Some constraints may represent strict requirements which must be met in order for the subgraph to represent a feasible network topology. For example, the maximum degree for each node must be satisfied in a subgraph, because it is not possible to implement a topology that requires a node to form more links than it is capable of forming. Other constraints may represent preferences that are desirable, but which may not be strictly necessary. For example, a subgraph representing a topology that achieves a low average latency may be preferred, but a subgraph representing a topology that achieves a higher average latency may be still be feasible. In some implementations, constraints that represent preferences rather than requirements may be assigned a numerical weight, and the relative weight of each constraint may indicate its importance relative to other constraints. In some implementations, a metric may be associated with a required value as well as a preferred value. For example, a lifetime duration of a topology may have a minimum required value below which the topology cannot be implemented in the network 307, and it also may be preferred to achieve a lifetime duration that is as long as possible, in order to reduce the number of network reconfigurations that must be performed. Such a constraint may be associated with both a required value and a preferred value, and also may be assigned a weight representing the importance of that constraint relative to other constraints. As described above in connection with FIG. 3, in some implementations a solver module such as the solver module 325 may receive the input graph and other constraint information from the topology and routing manager 310. The solver module may receive information corresponding to the provisioned network flows from the flow determination module 320.

The method 400 includes determining, by the solver module, a subgraph representing a network topology based on the input graph, the other constraints, and the provisioned network flows (stage 430). In some implementations, the solver module can be configured to treat the input graph, the additional constraints, and the provisioned network flows as the inputs to an optimization or maximization problem. For example, the solver module can determine the subgraph that represents a network topology that optimizes or otherwise improves one or more network performance metrics while simultaneously satisfying the provisioned network flows and not exceeding the constraints.

In some implementations, the network performance metric to be maximized may be a duration over which the input graph will continue to satisfy the provisioned network flows. Recalculating subgraphs representing new topologies and reconfiguring the network to implement new topologies may be computationally intensive tasks. Furthermore, redirecting transceivers associated with each network node to implement a new topology can result in a temporary disruption of links during the time required to steer the transceivers towards their new targets. Therefore, it may be beneficial to sacrifice other network performance metrics in order to achieve a topology that remains capable of satisfying the provisioned network flows over a relatively long period of time, so that frequent recalculation and reconfiguration of the network can be avoided. Similarly, the solver module can be configured to determine a subgraph representing a topology that has a minimal or reduced degree of change as compared to the current state of the network, while still satisfying all other constraints. A subgraph representing a topology that is similar to the current network topology can be preferred, because it may be implemented more quickly than a subgraph representing a topology that differs significantly from the current network topology. In some other implementations, other network performance metrics may be highly valued. For example, it may be desirable for the network to exhibit low latency across as many of the links as possible. Therefore, the solver module may determine the subgraph such that latency is minimized or reduced, even if such a topology will not satisfy the provisioned network flows for a long duration of time and will have to be updated more frequently.

In some implementations, the solver module can be configured to select a solution that is optimized for more than one performance metric. Each performance metric can be associated with a numerical weight that is proportional to the importance of that metric in the network. In one example, the computing resources allocated to the solver module may not be capable of recalculating subgraphs at a rapid rate, and therefore the lifetime of a topology may be highly valued to avoid overburdening the solver module. In this example, the topology duration metric may be assigned a relatively high weight, and other performance metrics, such as latency, may be assigned relatively lower weights. The solver module can be configured to generate a subgraph corresponding to a network topology that prioritizes each performance metric according to the relative weight assigned to each performance metric.

In some other implementations, the solver module can be configured to generate multiple subgraphs based on a single input graph. For example, the solver module can generate a plurality of subgraphs using different solving techniques. After a plurality of subgraphs have been generated, the solver module can compare the predicted network performance metrics for each subgraph to the weights associated with each performance metric, and can select the subgraph corresponding to the topology that most closely achieves the weighted performance metrics.

In some other implementations, the solver module can generate a plurality of subgraphs, each of which satisfies at least the required values for the constraints, and each subgraph can be assigned a score based on how well it achieves certain network performance metrics and on the relative weights assigned to the performance metrics. For example, in some implementations, each subgraph can be ranked across a variety of network performance metrics based on how well its topology satisfies each metric. The ranks can be multiplied by the relative weights assigned to their respective metrics (or otherwise modified to account for the weights assigned to their respective metrics), and the resulting data for each subgraph can be combined to generate an overall score for the subgraph. Then, the solver module can select the subgraph having the best overall score, and the other subgraphs can be discarded.

The solver module can be configured to generate the subgraph using any type of constraint-based solving technique. For example, the solver module can determine the subgraph by modeling various parameters as constraints, such as the degree of each node and the available bandwidth associated with each link. The solver module can then determine the subgraph using, for example, mixed integer programming, constraint programming, a Boolean problem, a genetic algorithm, or a greedy algorithm. In some implementations, determining the subgraph (step 430) may be carried out substantially simultaneously by two or more separate solver modules each using a different constraint-based problem solving technique. The resulting subgraphs can then be compared on the basis of the network performance achieved by implementing the topologies represented by the subgraphs, and the subgraph or subgraphs associated with the lower performance may be discarded. In some implementations, after the subgraph has been determined, the solver module also can generate updated routing information to allow the nodes of the network to correctly forward packets based on the network topology represented by the subgraph.

The method 400 includes assigning, by the network controller, links between the plurality of network nodes, based on the subgraph (stage 440). As discussed above, the vertices included in the subgraph can represent network nodes. Links can be assigned to each network node pair whose corresponding vertices in the subgraph are joined by an edge.

The method 400 includes determining, by the network controller, link establishment instructions for the plurality of nodes (stage 450). After the links have been assigned, the network controller can determine link establishment instructions based in part on the geographic locations of the nodes. For example, the relative positions of a pair of network nodes to be joined by a link can determine the direction in which each node of the pair of nodes should aim its transceiver to form the link if the nodes include steerable transceivers. In some implementations, the network controller can determine the direction in which each node should aim its respective transceivers, and can generate a set of instructions corresponding to these directions. In some implementations, the link establishment instructions for a node having a steerable transceiver may include instructions that cause the node to adjust the direction of its transceiver over time, for example to account for relative motion between the node and a second node with which the node forms a link.

The method 400 includes causing, by the network controller, the plurality of nodes to establish the assigned links (stage 460). In some implementations, the network controller can cause the plurality of nodes to establish the assigned links by transmitting the link establishment instructions to the plurality of nodes. Each of the plurality of nodes can be configured to implement the link establishment instructions upon receipt, for example by steering its respective transceiver in accordance with the link establishment instructions. In some implementations, the network controller also may send additional instructions to the plurality of nodes to facilitate the formation of links. For example, the network controller may send instructions to the network nodes indicating the power levels, frequencies, and modulations schemes that each node should use for transmitting data. In some implementations, the network controller also can send updated routing information to the nodes of the network so that each node correctly forwards packets through the network based on the updated topology.

In some implementations, the steps of the method 400 can be repeated one or more times to update the topology of the network to compensate for the relative motion the nodes of the network move over time. In some implementations, the method 400 can be repeated at regularly recurring intervals. For example, the method 400 can be repeated every 5 seconds, every 10 seconds, every 30 seconds, every minute, every 5 minutes, every 10 minutes, every 30 minutes, or every one or more hours. In some other implementations, the method 400 may be repeated at irregular intervals. For example, the method 400 may be repeated only when an updated network topology becomes necessary to satisfy the provisioned network flows. The network controller can monitor the provisioned network flows and the ability of the current network topology to satisfy the provisioned network flows. When the provisioned network flows exceed the capacity of the network to satisfy the flows, or when an existing link fails, the network controller can initiate execution of the method 400 to determine an updated network topology that can satisfy the provisioned flows. In implementations in which a link has failed, the network controller can generate an input graph that excludes either or both of the transceivers associated with the failed link. In still other implementations, the network controller may monitor the performance of the network, and may initiate execution of the method 400 to determine an updated network topology when certain performance metrics fall below respective thresholds. Thus, even if the current topology is capable of satisfying the provisioned network flows, the network controller may initiate execution of the method 400 in order to determine a more optimal topology.

Implementations of the subject matter and the operations described in this specification can be implemented in digital electronic circuitry, or in computer software embodied on a tangible medium, firmware, or hardware, including the structures disclosed in this specification and their structural equivalents, or in combinations of one or more of them. Implementations of the subject matter described in this specification can be implemented as one or more computer programs embodied on a tangible medium, i.e., one or more modules of computer program instructions, encoded on one or more computer storage media for execution by, or to control the operation of, a data processing apparatus. A computer storage medium can be, or be included in, a computer-readable storage device, a computer-readable storage substrate, a random or serial access memory array or device, or a combination of one or more of them. The computer storage medium can also be, or be included in, one or more separate components or media (e.g., multiple CDs, disks, or other storage devices). The computer storage medium may be tangible and non-transitory.

A computer program (also known as a program, software, software application, script, or code) can be written in any form of programming language, including compiled languages, interpreted languages, declarative languages, and procedural languages, and the computer program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, libraries, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., a field programmable gate array ("FPGA") or an application specific integrated circuit ("ASIC"). Such a special purpose circuit may be referred to as a computer processor even if it is not a general-purpose processor.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

References to "or" may be construed as inclusive so that any terms described using "or" may indicate any of a single, more than one, and all of the described terms. The labels "first," "second," "third," an so forth are not necessarily meant to indicate an ordering and are generally used merely to distinguish between like or similar items or elements.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking or parallel processing may be used.

The invention claimed is:

1. A method for configuring a network having a plurality of nodes including at least one moving node, the method comprising:
    determining, by a network controller of the network, available nodes and possible links in the network for a given point in time based on location information for each of the nodes;
    determining, by the network controller, a topology of the network for the given point in time based on the available nodes and the possible links;
    determining, by the network controller, a plurality of network flows for the determined topology, each of the plurality of network flows comprising one or more requirements for a routing path through the network;
    generating, by the network controller, a feasible network topology for the given point in time based on the determined plurality of network flows, the feasible network topology including one or more routing paths and identifying a subset of the possible links to be established using the plurality of nodes, wherein the feasible network topology is based on a predicted path of at least one node, and a duration of the feasible network topology based on the predicted path of the at least one node; and
    sending, by the network controller, instructions to one or more of the plurality of nodes of the network for implementing the feasible network topology for the given point in time.

2. The method of claim 1, wherein the determining the available nodes and possible links in the network includes generating an input graph that has a plurality of vertices each representing a respective one of the plurality of nodes and a plurality of edges each representing a possible link between two of the plurality of nodes.

3. The method of claim 1, wherein the determining the available nodes and possible links in the network includes receiving, from a given node in the network, a current location of the given node, a predicted path of the given node, current links associated with the given node, and routing information stored at the given node.

4. The method of claim 1, wherein the one or more requirements include flow bandwidth requirements.

5. The method of claim 1, wherein the one or more requirements include latency requirements.

6. The method of claim 1, wherein the feasible network topology is further based on a degree of change between the feasible network topology and a prior network topology.

7. The method of claim 1, wherein the instructions sent to one or more of the plurality of nodes of the network includes at least one beam steering instruction for at least one of the plurality of nodes to aim one or more transceivers based on the one or more routing paths.

8. The method of claim 1, wherein the instructions sent to one or more of the plurality of nodes of the network includes routing information for updating a routing table according to the one or more routing paths.

9. The method of claim 1, wherein the feasible network topology is a first feasible network topology; and wherein the method further comprises: generating, by the network controller, a second feasible network topology for the given point in time; and selecting, by the network controller, one of the first feasible network topology and the second feasible network topology based on a comparison of at least one network performance metric in each of the feasible network topologies.

10. A system for configuring a network, the system comprising:
- a network controller communicatively coupled to a plurality of nodes in the network, the plurality of nodes including a first node that is in motion relative to a second node;
- and wherein the network controller is configured to:
- determine available nodes and possible links in the network for a given point in time based on location information for each of the nodes; determine a topology of the communication network for the given point in time based on the available nodes and the possible links;
- determine a plurality of network flows for the determined topology, each of the plurality of network flows comprising one or more requirements for a routing path through the network;
- generate a feasible network topology for the given point in time, the feasible network topology including one or more routing paths and identifying a subset of the possible links to be established using the plurality of nodes, wherein the feasible network topology is based on a predicted path of at least one node, and at least one of a duration of the feasible network topology based on the predicted path of the at least one node or a degree of change between the feasible network topology and a prior network topology; and
- send instructions to the plurality of nodes of the network for implementing the feasible network topology for the given point in time.

11. The system of claim 10, further comprising the plurality of nodes.

12. The system of claim 10, wherein the plurality of nodes includes one or more ground stations and one or more high-altitude platforms.

13. The system of claim 10, wherein the network controller is configured to determine the available nodes and possible links in the network as an input graph that has a plurality of vertices each representing a respective one of the plurality of nodes and a plurality of edges each representing a possible link between two of the plurality of nodes.

14. The system of claim 10, wherein the network controller is configured to determine the available nodes and possible links in the network based on a current location of a given node of the plurality of nodes, a predicted path of the given node, current links associated with the given node, and routing information stored at the given node.

15. The system of claim 10, wherein the one or more requirements include flow bandwidth requirements.

16. The system of claim 10, wherein the one or more requirements include latency requirements.

17. The system of claim 10, wherein the instructions sent to one or more of the plurality of nodes of the network includes at least one beam steering instruction for at least one of the plurality of nodes to aim one or more transceivers based on the one or more routing paths.

18. The system of claim 10, wherein the instructions sent to one or more of the plurality of nodes of the network includes routing information for updating a routing table according to the one or more routing paths.

19. The system of claim 10, wherein the feasible network topology is a first feasible network topology; and wherein the network controller is further configured to: generate a second feasible network topology for the given point in time; and select one of the first feasible network topology and the second feasible network topology based on a comparison of at least one network performance metric in each of the feasible network topologies.

20. A method for configuring a network having a plurality of nodes including at least one moving node, the method comprising:
- determining, by a network controller of the network, available nodes and possible links in the network for a given point in time based on location information for each of the nodes;
- determining, by the network controller, a topology of the network for the given point in time based on the available nodes and the possible links;
- determining, by the network controller, a plurality of network flows for the determined topology, each of the plurality of network flows comprising one or more requirements for a routing path through the network;
- generating, by the network controller, a feasible network topology for the given point in time based on the determined plurality of network flows, the feasible network topology including one or more routing paths and identifying a subset of the possible links to be established using the plurality of nodes, wherein the feasible network topology is based on a predicted path of at least one node, and a degree of change between the feasible network topology and a prior network topology; and
- sending, by the network controller, instructions to one or more of the plurality of nodes of the network for implementing the feasible network topology for the given point in time.

* * * * *